(12) United States Patent
Fang

(10) Patent No.: US 9,367,899 B1
(45) Date of Patent: Jun. 14, 2016

(54) DOCUMENT IMAGE BINARIZATION METHOD

(71) Applicant: KONICA MINOLTA LABORATORY U.S.A., INC., San Mateo, CA (US)

(72) Inventor: Gang Fang, San Bruno, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/725,375

(22) Filed: May 29, 2015

(51) Int. Cl.
  *G06K 9/38* (2006.01)
  *G06T 5/00* (2006.01)
  *G06K 9/00* (2006.01)

(52) U.S. Cl.
  CPC .............. *G06T 5/00* (2013.01); *G06K 9/00442* (2013.01); *G06T 2207/10004* (2013.01); *G06T 2207/10024* (2013.01)

(58) Field of Classification Search
  USPC ......... 382/270, 290, 254, 112, 289, 173, 219, 382/168, 177, 164, 176, 199, 216; 358/1.9, 358/2.1, 462, 540
  See application file for complete search history.

(56) References Cited

U.S. PATENT DOCUMENTS

| | | | | |
|---|---|---|---|---|
| 8,265,345 B2* | 9/2012 | Gotoh | ............... | G06K 9/00442 358/1.9 |
| 8,538,184 B2* | 9/2013 | Neogi | ............... | G06K 9/00442 382/168 |
| 8,712,188 B2* | 4/2014 | Roy | ...................... | H04N 1/387 358/462 |

OTHER PUBLICATIONS

Gatos et al., "Adaptive degraded document image binarization", Pattern Recognition, vol. 39, Issues 3, Mar. 2006, pp. 317-327.
Jiang et al., "Adaptive Local Thresholding by Verification-based Multithreshold Probing with Application to Vessel Detection in Retinal Images", IEEE Transactions on Pattern Analysis and Machine Intelligence, vol. 25, No. 1, Jan. 2003, pp. 131-137.

* cited by examiner

*Primary Examiner* — Anh Do
(74) *Attorney, Agent, or Firm* — Chen Yoshimura LLP

(57) ABSTRACT

A method for binarization of document image using multi-threshold process to determine an optimum global binarization threshold for the image. The optimum binarization threshold is determined by binarizing the document multiple times using different threshold values, and calculating the statistics of the useful information and noise for each threshold value to select the optimum threshold value.

16 Claims, 2 Drawing Sheets

DOCUMENT IMAGE BINARIZATION METHOD

BACKGROUND OF THE INVENTION

1. Field of the Invention

This invention relates to method and related apparatus for binarizing document images.

2. Description of Related Art

An initial step in document image processing is binarization, i.e., to convert a multi-bit image (e.g. 8-bit image) into a 1 bit image. Document image refers to images generated from a hardcopy document, for example by scanning or photographing a document, where the document typically contains text and may also contain images and graphics. Binarization is typically performed before other processing such as OCR (optical character recognition).

In some conventional binarization methods, a global binarization threshold is used; pixels with values greater than the threshold is set to 1 and pixels with values lower than this threshold is set to 0. There are various existing methods for determination of the binarization threshold. One example is Otsu's method. However, when these methods are applied on real document images, they are often affected by image quality as well as image content. For example, many document images have a background color and embedded image, for which Otsu's method does not work well. Furthermore, some binarization methods are slow.

Some existing methods employ local threshold binarization, with a separation between the foreground and the background. Many such methods can deal with images output from cameras which tend to have a low quality. However, they involve high cost of computation. Some existing methods employ adaptive local thresholding based on verification based multi-threshold probing scheme.

SUMMARY

Accordingly, the present invention is directed to a document image binarization method and related apparatus that substantially obviate one or more of the problems due to limitations and disadvantages of the related art.

An object of the present invention is to provide a document image binarization method that accurately detects the global threshold of the document images which contain color background or embedded images so that the color background and embedded images can be removed. Another object of the present invention is to provide such a document image binarization method that is uncomplicated and fast.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for binarizing a multi-bit document image, which includes: (a) binarizing the document image a plurality of times, each time using one of a plurality of different binarization thresholds, to generate a plurality of corresponding binary images; for each of the binary images, (b) applying connected component analysis to the binary image to identify connected components in the binary image; (c) identifying all connected components in the binary image that are larger than a threshold size and have fill rates higher than a fill rate threshold and removing all connected components contained in bounding boxes of the identified connect components; and (d) counting a first number of connected components in the binary image that have sizes equal to or larger than a first threshold size, and counting a second number of connected components in the binary image that have sizes equal to or smaller than a second threshold size; (e) based on the first number and the second number of each binary image, selecting one of the binary images as the optimum binary image; and (f) outputting the optimum binary image.

In one implementation, step (e) includes: (f) defining a plurality of groups of binary images from the plurality of binary images, wherein the plurality of binarization thresholds form an increasing or decreasing sequence, and wherein each group includes a plurality of binary images corresponding to consecutive binarization thresholds in the sequence; (g) for each group, computing a first average value which is an average of the first numbers and a second average value which is an average of the second numbers; (h) based on the first average values and the second average values of the plurality of groups, selecting one of the groups as an optimum group; and (i) within the optimum group, based on the first number and the second number of each binary image, selecting one of the binary images as the optimum binary image.

In one implementation, the selecting step (h) includes: (h1) if the second average values of the plurality of groups have only one local minimum, selecting the group corresponding to that second average value as the optimum group; and (h2) if the second average values of the plurality of groups have two or more local minimums, (h3) selecting a first group and a second group corresponding respectively to a first and a second one of the local minimums; (h4) if the second average value of the first group is significantly greater than the second average value of the second group, or if the second average value of the first group less than the second average value of the second group and the first average value of the first group is significantly less than the first average value of the second group, selecting the second group as the optimum group; and (h5) otherwise selecting the first group as the optimum group.

In one implementation, the selecting step (h4) includes: if the second average value of the first group is greater than 1.25 times the second average value of the second group, or if the second average value of the first group less than the second average value of the second group and the first average value of the first group is less than two thirds of the first average value of the second group, selecting the second group as the optimum group.

In one implementation, the selecting step (i) includes: calculating a difference value of the first number and the second number for each binary image; and selecting one of the binary images that has a largest difference value as the optimum binary image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for binarization of document image using multi-threshold process to determine an optimum global binarization threshold for the image. The optimum binarization threshold is determined by binarizing the document multiple times using different threshold values, and calculating the statistics of the useful information and noise for each threshold value to select the optimum threshold value.

In the description below, the document image is a grayscale image with darker (black or darker gray) content (e.g. text, image) on a lighter (white or light gray) background. The method is also applicable to inverted images (lighter colored text on darker background) with appropriate modifications. In the description below, an 8-bit image is used as an example, and it is assumed that the pixel value for white is zero (the pixel values for white and black are a matter of convention).

Generally speaking, if the background in the document image is very close to white, the optimum binarization threshold will be a relatively low value (i.e. a value close to white) so that even lighter colored content will be set to black in the binarized image. However, for a document image with a non-white (e.g. a light gray) background, the optimum threshold will be higher (i.e. darker) than that for an image with a white background, so that the light colored background can be removed (i.e. set to white) by binarization. For a document with embedded images, the optimum threshold should be relatively low (i.e. lighter) so that in the binarized image, the areas of the embedded image will have sufficiently high fill rate (i.e. the percentage of black pixels in the area) which facilitates the removal of the embedded image. An embodiment of the present invention provides a method, as schematically illustrated in FIGS. 1 and 2, for determining an optimum binarization threshold for a document image.

Figure 1:
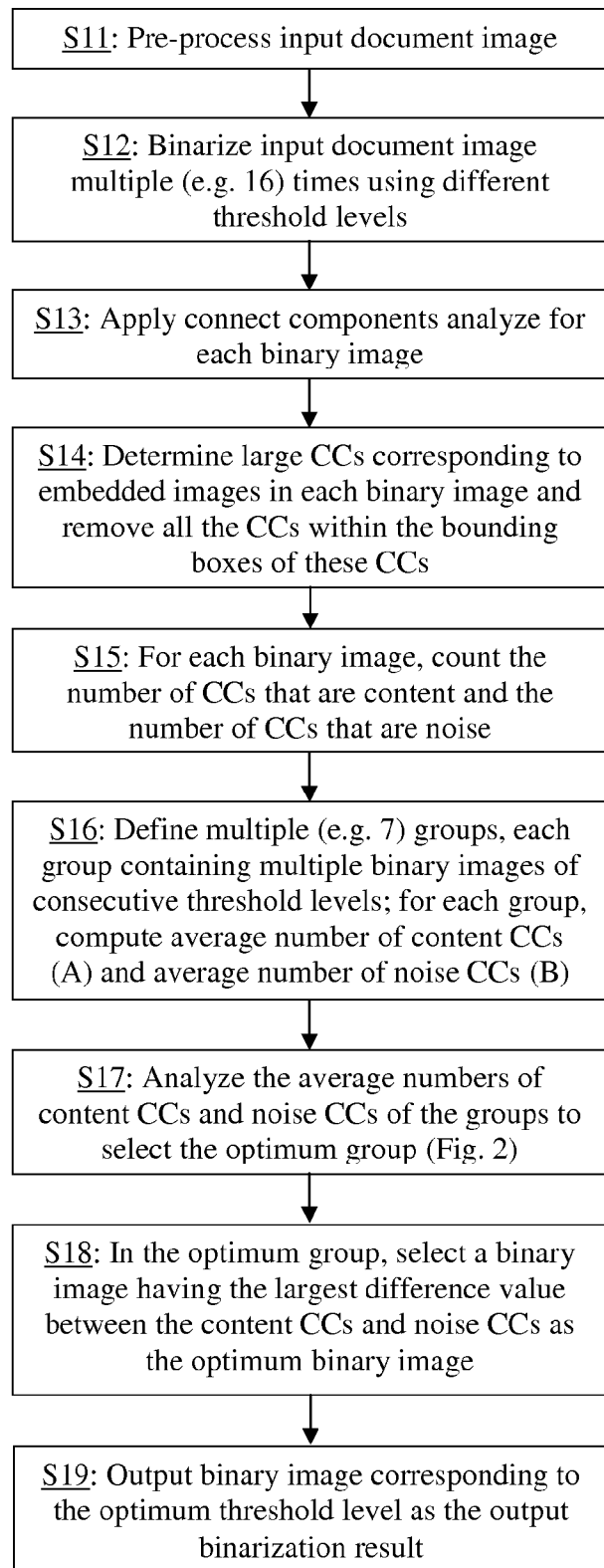
FIGS. 1 and 2 schematically illustrate a document image binarization method according to an embodiment of the present invention.
Figure 2:
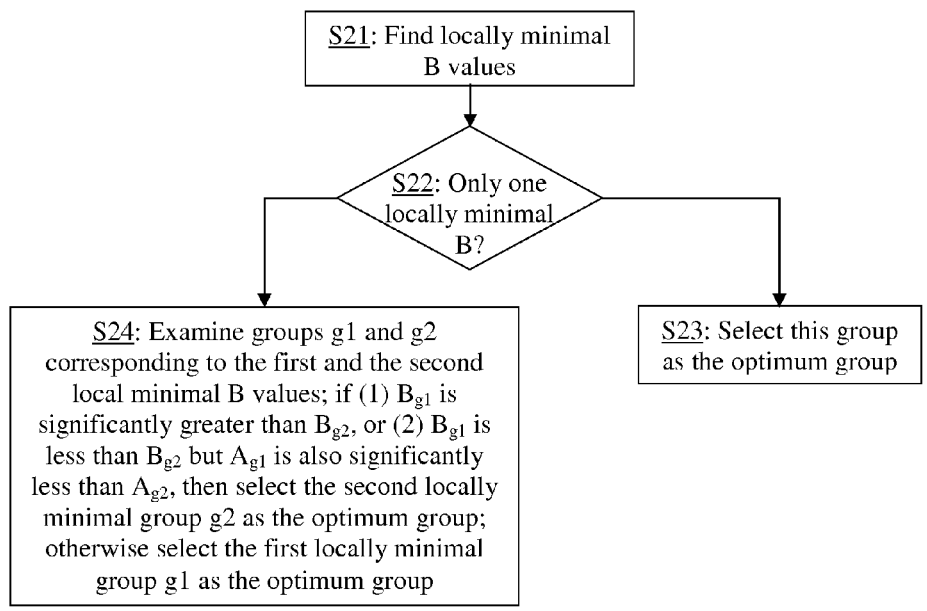

As shown in FIG. 1, the input document image first undergoes pre-processing, including, for example, de-skew, noise removal, down sampling, etc. (step S11). In one implementation, the input document is down-sampled by 25%. Next, the document image is binarized multiple times using multiple different binarization thresholds to generate multiple corresponding binary images (step S12). Each binarization threshold can be a value from 1 to 254. In one implementation, 16 binarization thresholds are used with values 10, 20, . . . to 160. These threshold values are referred to as level 1, level 2, . . . to level 16. Of course, a different number of threshold levels and different values of the thresholds may be used.

For each binary image generated in step S12, connected components analysis is applied to identify all connected components in the image (step S13). A connected component in a binary image is a group of one or more black pixels that are connected to each other. The connected components are examined and those that correspond to an embedded images are removed as follows (step S14): For each connected component, if it has a size larger than a threshold size and a fill rate higher than a threshold fill rate in its bounding box, then all black pixels (all connected components) within its bounding box are removed (i.e. set to white). In step S14, the size of a connected component is defined by the number of black pixels it contains, or by the size of its bounding box. A bounding box of a connected component is the smallest rectangular box that contains all black pixels of the connected component. The fill rate is the percentage of pixels in the bounding box that are black. In one implementation of step S14, connected components that have a bounding box larger than 150 by 150 pixels and a fill rate greater than 50%, are deemed an embedded image and removed. Of course, other criteria may also be used.

For the remaining connected components of each binary image, those that have a size equal to or smaller than a first threshold size (e.g. 2 pixels) are deemed noise, and those that have a size equal to or greater than a second threshold size (e.g. 6 pixels) are deemed content. In each binary image obtained in step S14, the number of connect components that are noise ("noise CC") are counted, and the number of connect components that are content ("content CC") are also counted (step S15).

Figure 3A:
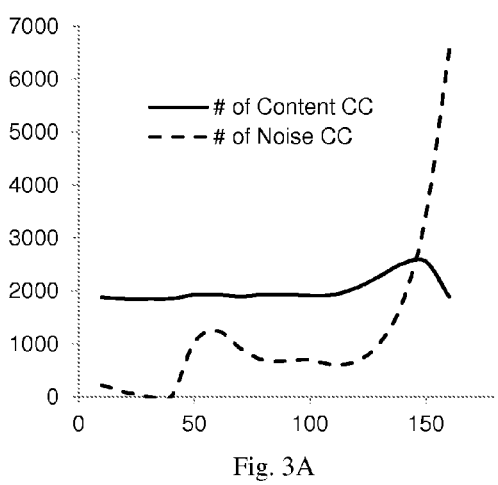
FIGS. 3A and 3B illustrate examples of data processing results for the document image binarization method according to the embodiment.

FIG. 3A shows curves of the numbers of noise CC and content CC, respectively, of the 16 binary images in one example. It can be seen that, in this particular example, for the few higher threshold values, the number of content CC drops while the number of noise rises. This corresponds to the fact that for these higher threshold values, the binary images start to loose contents and the contents start to be broken up into small fragments. It can also be seen that the number of noise CC has a non-monotonous relationship with the threshold level.

An optimum binarization threshold is one that would increase the number of content CC while decreasing the number of noise CC. Steps S16 to S18 are performed to determine the optimum binarization threshold level.

First, multiple groups of binary images are defined, each group containing multiple binary images of consecutive threshold levels. In one example, seven groups of binary images are defined, each group containing four binary images of consecutive threshold levels, e.g., from level 1 to level 4 (group 1), from level 3 to level 6 (group 2), from level 5 to level 8 (group 3), from level 7 to level 10 (group 4), from level 9 to level 12 (group 5), from level 11 to level 14 (group 6) and from level 13 to level 16 (group 7). For each group of binary images, the average number of connected components that are information ("A"), and the average number of connected components that are noise ("B"), are computed (step S16). The average is taken over the multiple binary images in each group. The purpose of this grouping is to average out small variations in the numbers of information and noise CCs in individual binary images. In this sense the multiple groups can be viewed as a moving window.

Figure 3B:
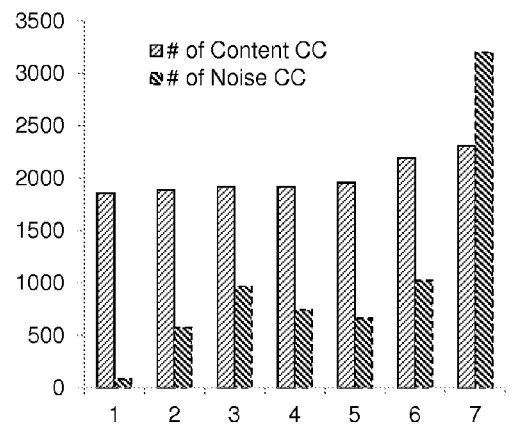

FIG. 3B is a bar chart showing the average numbers of noise CC and content CC, respectively, of the seven groups in the above example.

In step S17, the average numbers of content CCs (A) and noise CCs (B) of the groups are examined to select an optimum group. The details of step S17 is explained below with reference to FIG. 2. First, the B values of the multiple groups are examined to determine the locally minimal B values (step S21). If there is only one locally minimal B value ("Yes" in step S22), that group is selected as the optimum group (step S23). In the example of FIG. 3B, the B value for group 5 is a local minimal; the B value for group 1 is also considered a local minimal even though the graph has no B value to the left of group 1.

If there are two or more locally minimal B values ("Yes" in step S22), the groups corresponding to the first and the second (from the left) local minimal B values, referred to as g1 and g2 here, are compared as follows to select the optimum group (step S24). If (1) $B_{g1}$ is significantly greater than $B_{g2}$, or if (2) $B_{g1}$ is less than $B_{g2}$ but $A_{g1}$ is also significantly less than $A_{g2}$, then the second locally minimal group g2 is selected as the optimum group; otherwise, the first locally minimal group g1 is selected as the optimum group. Generally, the goal of the selection criteria is to select a group that gives more content CCs and fewer noise CCs.

In one implementation, the above two conditions are specifically: If (1) $B_{g1} > 1.25 B_{g2}$, or if (2) $B_{g1} < B_{g2}$ and $1.5 A_{g1} < A_{g2}$, then the second locally minimal group is selected as the optimum group; otherwise, the first locally minimal group is selected as the optimum group. This specific example was obtained based on analyzing a large number of sample document images.

In the above example (see FIG. 3B), group 1 and group 5 meet neither the first condition, $B_{g1} > 1.25 B_{g2}$, nor the second condition, $B_{g1} < B_{g2}$ and $1.5 A_{g1} < A_{g2}$; therefore, the first locally minimal group, group 1, is selected as the optimum group.

Then, in step S18, one binary image within the selected optimum group that gives more content and less noise is selected as the optimum binarization threshold. Specifically, for each binary image in the optimum group, the difference between the number of content CCs and the number of noise CCs is calculated. This difference value is expected to be a large positive number. The binary image having the largest difference value is selected as the optimum binary image. This optimum binary image can then be output as the binarization result for the input document image (step S19).

To summarize, the document image binarization method described in this disclosure has the following features and advantages: (1) The document is binarized using multiple binarization thresholds, and the optimum binarization threshold is determined based on the comparison of the amounts of noise and content in the multiple binary images. Thus the optimum binarization threshold determination is more reliable. (2) The method can deal with document images containing non-white background and embedded images. (3) The algorithm is simple and fast when multi-thread is applied.

This document image binarization method can handle document images with non-uniform background so long as there is a significant gap between the pixel values of the background and the pixel values of the content.

Further, although in the above description the document image binarization method is applied to a whole document image globally, it can also be used in a local manner to binarize a portion of a document image; i.e., within a portion of the image, the method can be applied to binarize that portion.

The methods described above can be implemented in a data processing system which includes a processor and a memory or storage device. The data processing system may be a standalone computer or it may be contained in a printer, copier, scanner or multi-function device. The data processing system carries out the method by the processor executing computer programs stored in the memory or storage device. In one aspect, the invention is embodied in a data processing system. In another aspect, the invention is computer program product embodied in computer usable non-transitory medium having a computer readable program code embedded therein for controlling a data processing apparatus. In another aspect, the invention is a method carried out by a data processing system.

It will be apparent to those skilled in the art that various modification and variations can be made in the document image binarization method and related apparatus of the present invention without departing from the spirit or scope of the invention. Thus, it is intended that the present invention cover modifications and variations that come within the scope of the appended claims and their equivalents.

What is claimed is:

1. A method implemented in a data processing system which includes a processor and a memory, for binarizing a multi-bit document image, comprising:
   (a) binarizing the document image a plurality of times, each time using one of a plurality of different binarization thresholds, to generate a plurality of corresponding binary images;
   for each of the binary images,
   (b) applying connected component analysis to the binary image to identify connected components in the binary image;
   (c) identifying all connected components in the binary image that are larger than a threshold size and have fill rates higher than a fill rate threshold and removing all connected components contained within bounding boxes of the identified connected components; and
   (d) counting a first number of connected components in the binary image that have sizes equal to or larger than a first threshold size, and counting a second number of connected components in the binary image that have sizes equal to or smaller than a second threshold size;
   (e) based on the first number and the second number of each binary image, selecting one of the binary images as the optimum binary image; and
   (f) outputting the optimum binary image.

2. The method of claim 1, wherein in the removing step (c), the threshold size is 150 by 150 pixels and the threshold fill rate is 50%.

3. The method of claim 1, wherein in the counting step (d), the first threshold size is 6 pixels and the second threshold size is 2 pixels.

4. The method of claim 1, wherein step (e) comprises:
   (f) defining a plurality of groups of binary images from the plurality of binary images, wherein the plurality of binarization thresholds form an increasing or decreasing sequence, and wherein each group includes a plurality of binary images corresponding to consecutive binarization thresholds in the sequence;
   (g) for each group, computing a first average value which is an average of the first numbers and a second average value which is an average of the second numbers;
   (h) based on the first average values and the second average values of the plurality of groups, selecting one of the groups as an optimum group; and
   (i) within the optimum group, based on the first number and the second number of each binary image, selecting one of the binary images as the optimum binary image.

5. The method of claim 4, wherein the selecting step (h) comprises:
   (h1) if the second average values of the plurality of groups have only one local minimum, selecting the group corresponding to that second average value as the optimum group; and
   (h2) if the second average values of the plurality of groups have two or more local minimums,
   (h3) selecting a first group and a second group corresponding respectively to a first and a second one of the local minimums;
   (h4) if the second average value of the first group is significantly greater than the second average value of the second group, or if the second average value of the first group less than the second average value of the second group and the first average value of the first group is significantly less than the first average value of the second group, selecting the second group as the optimum group; and (h5) otherwise selecting the first group as the optimum group.

6. The method of claim 5, wherein the selecting step (h4) comprises:
   if the second average value of the first group is greater than 1.25 times the second average value of the second group, or if the second average value of the first group less than the second average value of the second group and the first average value of the first group is less than two thirds of the first average value of the second group, selecting the second group as the optimum group.

7. The method of claim 4, wherein the selecting step (i) comprises:
   calculating a difference value of the first number and the second number for each binary image; and
   selecting one of the binary images that has a largest difference value as the optimum binary image.

8. The method of claim 4, wherein in the binarizing step (a), the document image is binarized 16 times using 16 binarization thresholds, and wherein the defining step (f) defines 7 groups of binary images.

9. A computer program product comprising a computer usable non-transitory medium having a computer readable program code embedded therein for controlling a computer, the computer readable program code configured to cause the computer to execute a process for binarizing a multi-bit document image, the process comprising:
   (a) binarizing the document image a plurality of times, each time using one of a plurality of different binarization thresholds, to generate a plurality of corresponding binary images;
   for each of the binary images,
   (b) applying connected component analysis to the binary image to identify connected components in the binary image;
   (c) identifying all connected components in the binary image that are larger than a threshold size and have fill rates higher than a fill rate threshold and removing all connected components contained within bounding boxes of the identified connected components; and
   (d) counting a first number of connected components in the binary image that have sizes equal to or larger than a first threshold size, and counting a second number of connected components in the binary image that have sizes equal to or smaller than a second threshold size;
   (e) based on the first number and the second number of each binary image, selecting one of the binary images as the optimum binary image; and
   (f) outputting the optimum binary image.

10. The computer program product of claim 9, wherein in the removing step (c), the threshold size is 150 by 150 pixels and the threshold fill rate is 50%.

11. The computer program product of claim 9, wherein in the counting step (d), the first threshold size is 6 pixels and the second threshold size is 2 pixels.

12. The computer program product of claim 9, wherein step (e) comprises:
   (f) defining a plurality of groups of binary images from the plurality of binary images, wherein the plurality of binarization thresholds form an increasing or decreasing sequence, and wherein each group includes a plurality of binary images corresponding to consecutive binarization thresholds in the sequence;
   (g) for each group, computing a first average value which is an average of the first numbers and a second average value which is an average of the second numbers;
   (h) based on the first average values and the second average values of the plurality of groups, selecting one of the groups as an optimum group; and
   (i) within the optimum group, based on the first number and the second number of each binary image, selecting one of the binary images as the optimum binary image.

13. The computer program product of claim 12, wherein the selecting step (h) comprises:
   (h1) if the second average values of the plurality of groups have only one local minimum, selecting the group corresponding to that second average value as the optimum group; and
   (h2) if the second average values of the plurality of groups have two or more local minimums,
   (h3) selecting a first group and a second group corresponding respectively to a first and a second one of the local minimums;
   (h4) if the second average value of the first group is significantly greater than the second average value of the second group, or if the second average value of the first group less than the second average value of the second group and the first average value of the first group is significantly less than the first average value of the second group, selecting the second group as the optimum group; and
   (h5) otherwise selecting the first group as the optimum group.

14. The computer program product of claim 13, wherein the selecting step (h4) comprises:
   if the second average value of the first group is greater than 1.25 times the second average value of the second group, or if the second average value of the first group less than the second average value of the second group and the first average value of the first group is less than two thirds of the first average value of the second group, selecting the second group as the optimum group.

15. The computer program product of claim 12, wherein the selecting step (i) comprises:
   calculating a difference value of the first number and the second number for each binary image; and
   selecting one of the binary images that has a largest difference value as the optimum binary image.

16. The computer program product of claim 12, wherein in the binarizing step (a), the document image is binarized 16 times using 16 binarization thresholds, and wherein the defining step (f) defines 7 groups of binary images.

* * * * *